United States Patent
Afzulpurkar et al.

(10) Patent No.: US 8,270,711 B2
(45) Date of Patent: Sep. 18, 2012

(54) METHOD AND APPARATUS FOR RECOGNITION OF AN OBJECT BY A MACHINE

(75) Inventors: Nitin Afzulpurkar, Bangkok (TH); Tran Minh Thuan, Ho Chi Minh (VN)

(73) Assignee: Asian Institute of Technology, Pathumthani (TH)

( * ) Notice: Subject to any disclaimer, the term of this patent is extended or adjusted under 35 U.S.C. 154(b) by 1192 days.

(21) Appl. No.: 11/837,274

(22) Filed: Aug. 10, 2007

(65) Prior Publication Data

US 2009/0041299 A1 Feb. 12, 2009

(51) Int. Cl.
*G06K 9/34* (2006.01)
*G06K 9/00* (2006.01)
*G06K 9/46* (2006.01)
*G06K 9/66* (2006.01)
*G06K 9/62* (2006.01)

(52) U.S. Cl. ........ 382/164; 382/103; 382/106; 382/171; 382/173; 382/181; 382/190; 382/209

(58) Field of Classification Search .............. 382/103, 382/106, 164, 171, 173, 181, 190, 209
See application file for complete search history.

(56) References Cited

U.S. PATENT DOCUMENTS

| | | | |
|---|---|---|---|
| 5,892,837 A * | 4/1999 | Luo et al. | 382/117 |
| 6,072,893 A * | 6/2000 | Luo et al. | 382/117 |
| 6,714,665 B1 * | 3/2004 | Hanna et al. | 382/117 |
| 6,895,103 B2 * | 5/2005 | Chen et al. | 382/117 |
| 2002/0136449 A1 * | 9/2002 | Park et al. | 382/164 |
| 2007/0014431 A1 * | 1/2007 | Hammoud et al. | 382/103 |
| 2008/0031493 A1 * | 2/2008 | Brogren et al. | 382/103 |
| 2008/0080749 A1 * | 4/2008 | Nonaka et al. | 382/118 |
| 2008/0107311 A1 * | 5/2008 | Huang et al. | 382/118 |
| 2008/0107345 A1 * | 5/2008 | Melikian | 382/209 |
| 2008/0212849 A1 * | 9/2008 | Gao | 382/118 |
| 2008/0232652 A1 * | 9/2008 | Nonaka et al. | 382/118 |
| 2008/0252722 A1 * | 10/2008 | Wang et al. | 348/143 |

FOREIGN PATENT DOCUMENTS

WO    WO 2005057472 A1 *    6/2005

OTHER PUBLICATIONS

He, L.—"Graph matching for object recognition and recovery"—Pattern Recognition 37—2004, pp. 1557-1560.*
Kim, N.—"Segmentation of object regions using depth information"—IEEE—ICIP 2004, pp. 231-234.*
Hu, Min et al., Multi-camer correspondence based on principal axis of human body, 2004 International Conference on Image Processing (ICIP), IEEE vol. 2, Oct. 24-27, 2004, pp. 1057-1060, Singapore.

\* cited by examiner

*Primary Examiner* — Bernard Krasnic

(57) ABSTRACT

Method and apparatus for machine recognition of an object depicted in an image. The image is filtered to help isolate the object. The machine segments the object to determine relationships between one or more object segments. The relationships between the one or more object segments are then compared to known characteristics to facilitate machine recognition of the object.

58 Claims, 19 Drawing Sheets

METHOD AND APPARATUS FOR RECOGNITION OF AN OBJECT BY A MACHINE

BACKGROUND

1. Technical Field

The subject matter disclosed herein generally relates to recognition of an object. More specifically, the subject matter relates to recognition of an object by a machine.

2. Information

Commonly, machines may need to recognize objects that they may interact with. For example, a machine such as, but not limited to, a robot may need to recognize an object to interact with that object. However, recognizing an object by a machine may require various sensors such as, but not limited to, image sensors. Processing the images from these image sensors can be processor intensive, and in particular, if the machine is interacting with the object in real-time. Accordingly, recognizing an object and processing the image by a machine may detrimentally affect the interactive experience with the machine (i.e., machines may be slow to react or follow).

BRIEF DESCRIPTION OF THE DRAWINGS

Embodiments are illustrated by way of example and not by way of limitation in the figures of the accompanying drawings, in which like references may indicate similar elements and in which.

DETAILED DESCRIPTION

In the following description, various embodiments will be disclosed. However, it will be apparent to those skilled in the art that the embodiments may be practiced with only some or all disclosed subject matter. For purposes of explanation, specific numbers, materials, and/or configurations are set forth in order to provide a thorough understanding of the embodiments. However, it will also be apparent to one skilled in the art that the embodiments may be practiced without one or more of the specific details, or with other approaches, materials, components, etc. In other instances, well-known structures, materials, and/or operations are not shown and/or described in detail to avoid obscuring the embodiments. Accordingly, in some instances, features are omitted and/or simplified in order to not obscure the disclosed embodiments. Furthermore, it is understood that the embodiments shown in the figures are illustrative representations and are not necessarily drawn to scale.

References throughout this specification to "one embodiment" or "an embodiment" means that a particular feature, structure, material, and/or characteristic described in connection with the embodiment is included in at least one embodiment. Thus, the appearances of the phrases "in one embodiment" and/or "in an embodiment" in various places throughout this specification are not necessarily all referring to the same embodiment. Furthermore, the particular features, structures, materials, and/or characteristics may be combined in any suitable manner in one or more embodiments.

Parts of the description will be presented in terms of operations performed by a computer system, using terms such as, data, flags, bits, values, characters, strings, numbers and the like, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical and electrical components of the computer system, and the term computers system includes general purpose as well as special purpose data processing machines, systems, and the like, that are standalone, adjunct or embedded.

Various operations will be described as multiple discrete steps in turn, in a manner that is most helpful in understanding the claimed subject matter. However, the order of description should not be construed as to imply that these operations are necessarily order dependent. In particular, these operations need not be performed in the order of presentation.

In various embodiments of the claimed subject matter, an improved way of recognition and tracking of a subject of interest is facilitated. These and other advantages will be evident from the disclosure.

Figure 1:
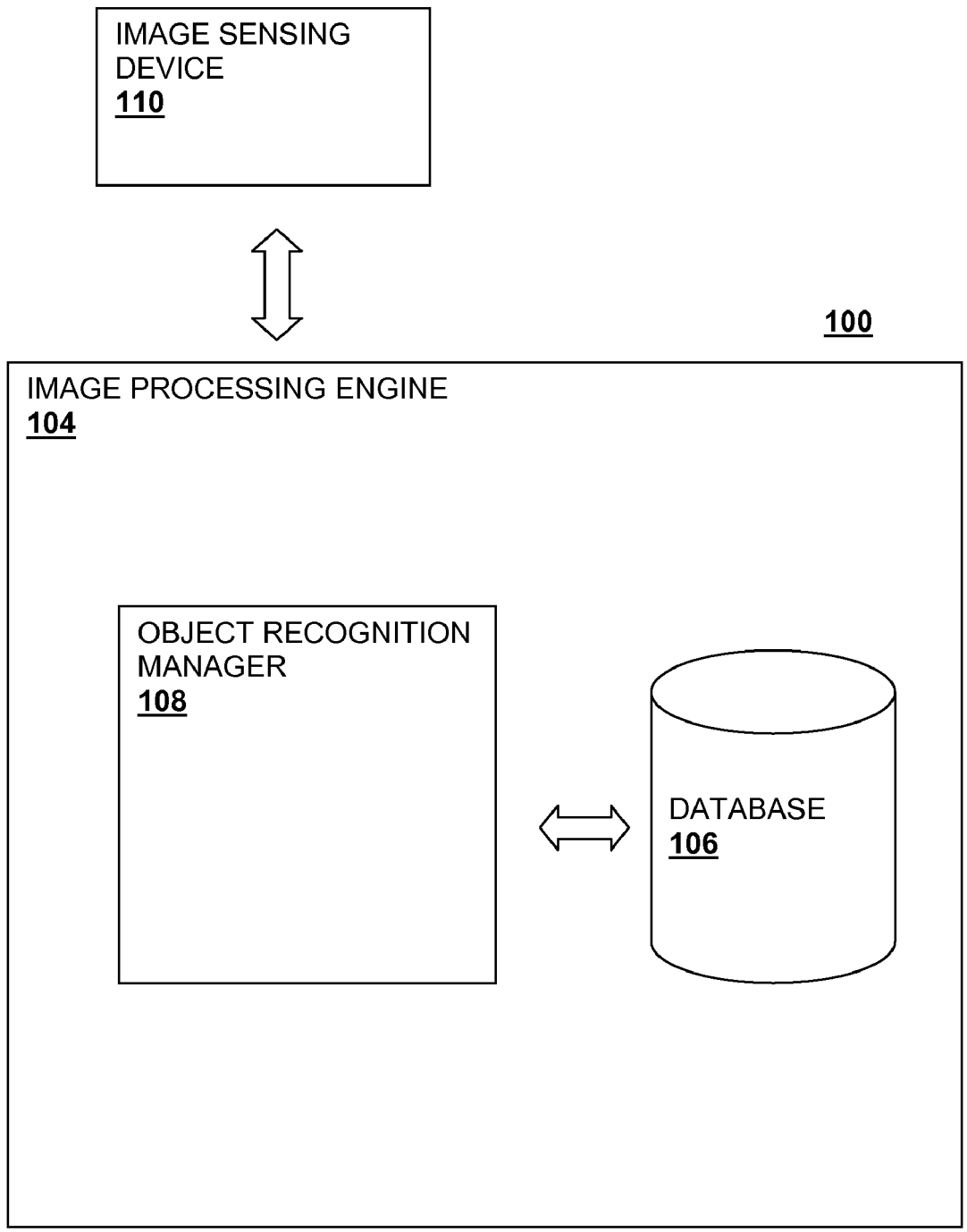
FIG. 1 illustrates a block diagram of one embodiment of an object recognition application for facilitating isolation and recognition of an object in accordance with various embodiments.

FIG. 1 illustrates a block diagram of one embodiment of an object recognition application for facilitating isolation and recognition of an object in accordance with various embodiments. In FIG. 1, image processing application 100 may include an image processing engine 104 and a database 106. Additionally, image processing engine 104 may include an object recognition manager 108. Object recognition manager 108 may be communicatively coupled to an image sensing device 110 in accordance with various embodiments. Together, the elements may cooperate to isolate and process an object in accordance with various embodiments.

In FIG. 1, image processing engine 104 may receive an image from image sensing device 110. Under the control of image processing engine 104, database 106 may operate to store various information regarding the received image including information regarding an object (i.e., an object of interest) within the received image. Once the object has been isolated and processed by object recognition manager 108, the information may be stored within database 106, thereby helping to facilitate recognition of the object.

As will be described in further detail, image processing engine 104 may include a wide variety of image processing methods. Additionally, image sensing device may include a wide variety of image sensing devices such as, but not limited to, a charged coupled device (CCD) in accordance with one embodiment. Image sensing device 108 may be semiconductor type device having pixels with metal-oxide-semiconductor field-effect transistor (MOSFET) and fabricated utilizing a complementary metal oxide semiconductor (CMOS) type process.

Figure 2A:
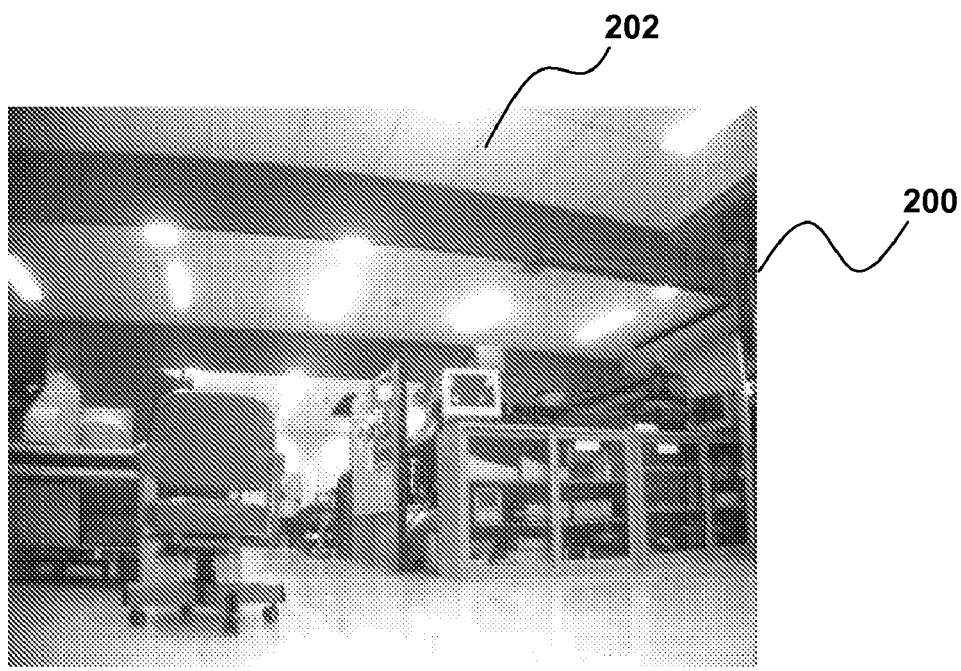
FIGS. 2A & 2B illustrate isolating an object from an image in accordance with one embodiment.
Figure 2B:
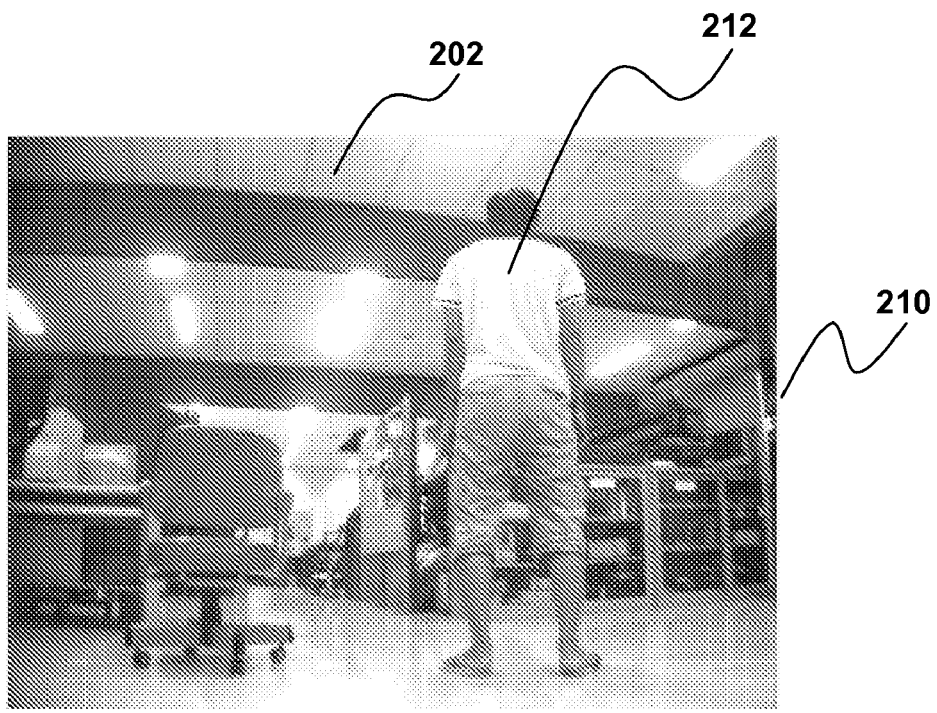

FIGS. 2A & 2B illustrate isolating an object from an image in accordance with one embodiment. Illustrated in FIG. 2A, a first image 200 may be received from an image capturing device such as, but not limited to, the image capturing device 110 shown in FIG. 1. In the illustrated embodiment, first image 200 may be an image of surroundings 202 of the image capturing device 110 (i.e., surroundings of a camera and/or machine). Moving onto FIG. 2B, in accordance with the illustrated embodiment, a second image 210 may be received from image capturing device 110. As shown, second image 210 may include an image that may be substantially similar to the first image 200 (i.e., may be substantially similar to image of surroundings 202). However, second image 210 may include an object 212.

As shown in FIGS. 2A & 2B, first image 200 may not include object 212 while second image 210 may include object 212. In other words, first image 200 may be different from second image 210 because of an inclusion of object 212 within surroundings 202 resulting in the second image 210. Accordingly, object 212 within the second image 210 may be isolated.

In the illustrated embodiments of FIGS. 2A & 2B, object 212 may be a human for example. However, it should be appreciated by those skilled in the art that object 212 may include a wide variety of objects such as, but not limited to, objects of interest, and accordingly is not limited in these respects.

For illustrative purposes, surrounds 202 may be shown as an office type setting (i.e., chairs, desks, etc.) as in the embodiments of FIGS. 2A & 2B. However, it should be appreciated that surroundings 202 may be any type of surrounds such as, but not limited to, outdoors, indoors, including blank surroundings (i.e., a screen type setting), etc.

Figure 3:
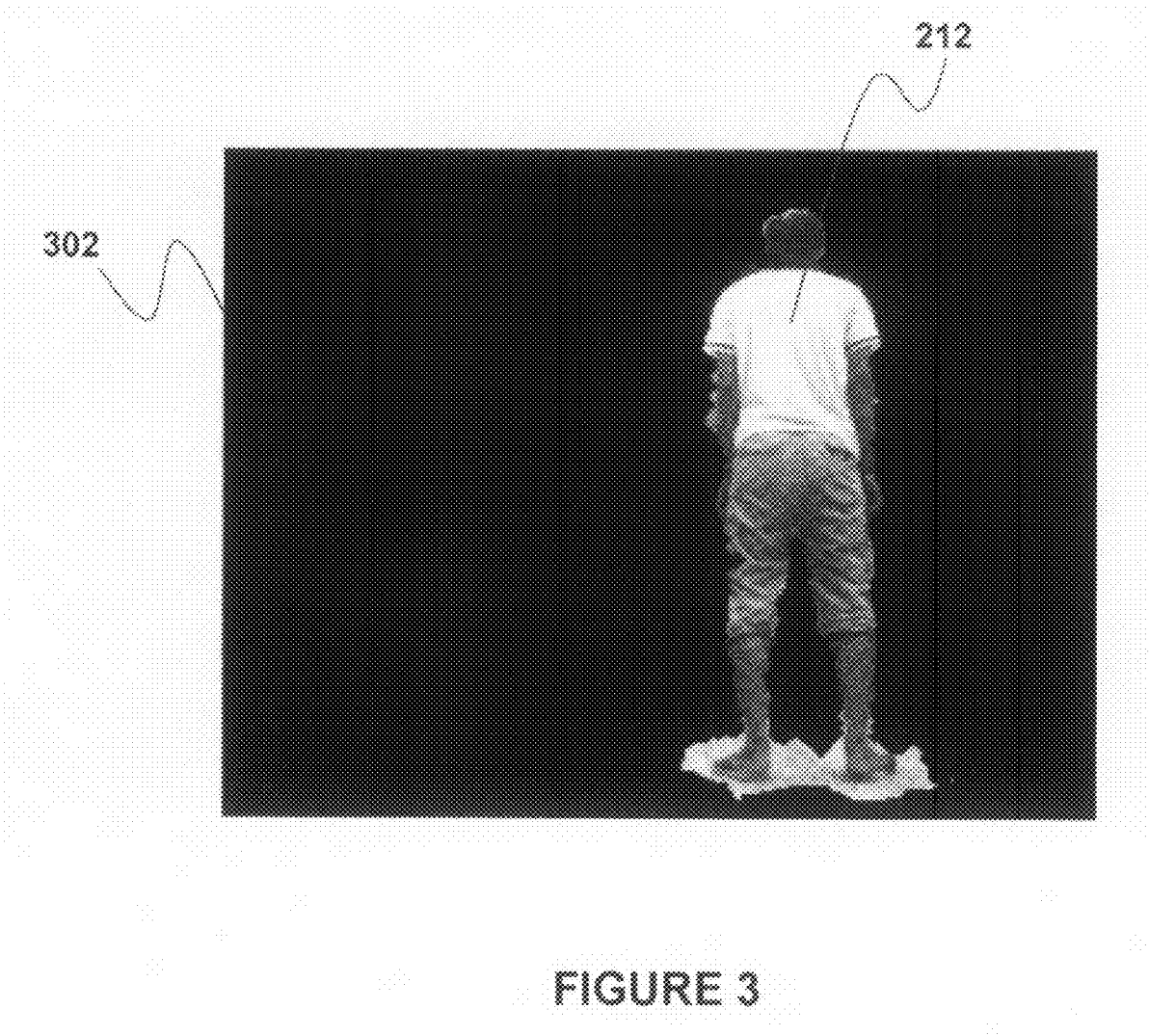
FIG. 3 illustrates isolating an object in accordance with another embodiment.

FIG. 3 illustrates isolating an object in accordance with another embodiment. In FIG. 3, surroundings 202 may be graphically removed from second image 210 leaving object 212 within the second image 210 as shown. An example may be to remove substantially all of details of surroundings 202 leaving object 212 on a substantially blank background 302 as shown in the embodiment illustrated in FIG. 3.

As will be described in further detail, in one embodiment, isolating an object may comprise of stereo filtering, where stereo filtering may comprise utilizing depth of image processing. In another embodiment, isolating an object may comprise of determining if the object is included within a database, where determining if the object is included within a database may comprise comparing the object to a knowledge database. In yet another embodiment, isolating an object may comprise of color filtering. In one embodiment, isolating an object may comprise of applying a shape filter. In one embodiment, isolating an object may comprise of applying a relationship filter.

In FIG. 3, in order to illustrate isolating of an object, substantially blank background 302 may be shown as a substantially dark background (i.e., black background). However, it should be appreciated by those skilled in the art that isolating an object may be shown by a wide variety of means such as, but not limited to, substantially light background, graphical removal of a background, graphically altering differentiating the background from an object (i.e., object of interest), etc. Accordingly, the claimed subject matter is not limited in these respects.

Figure 4:
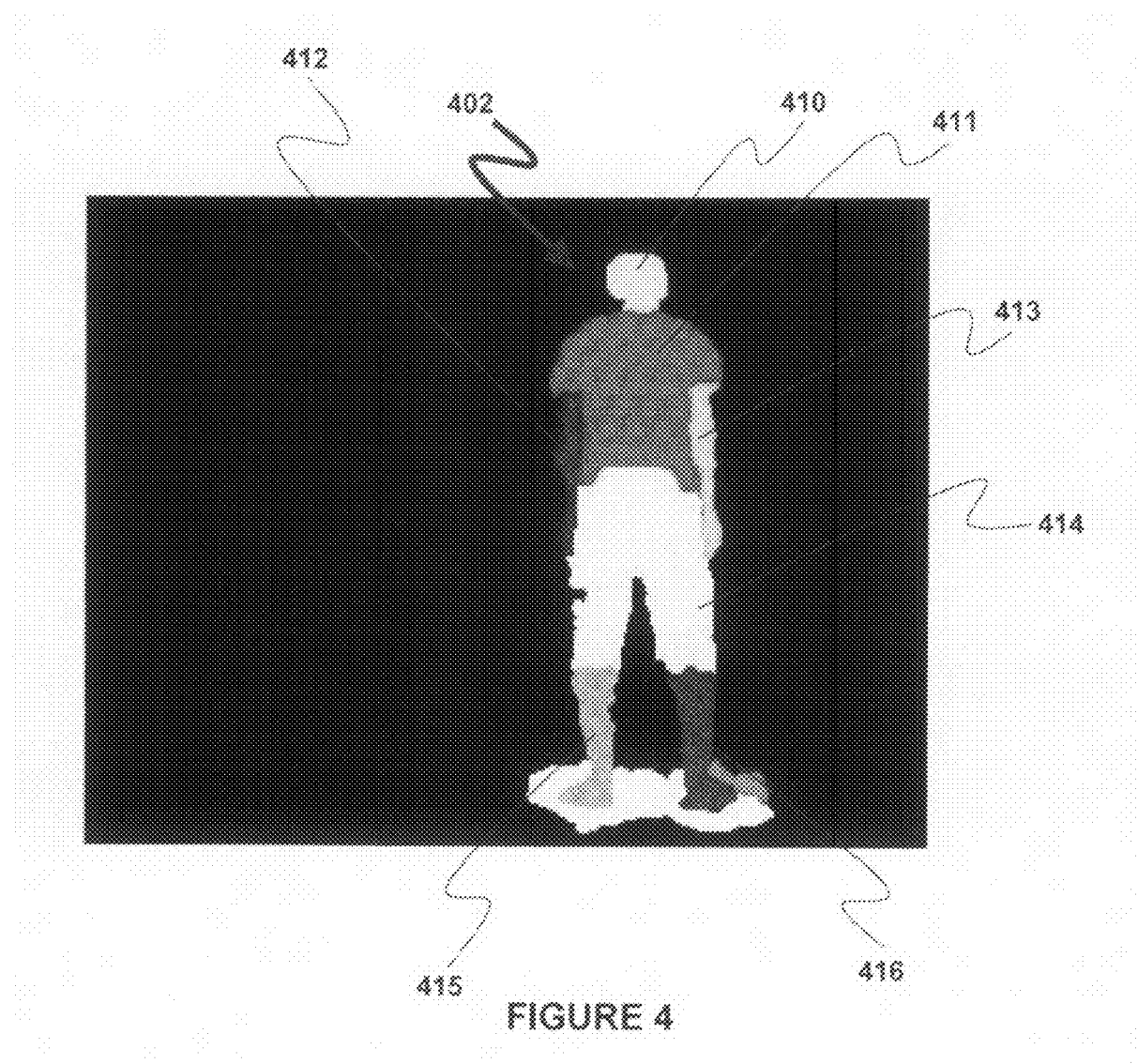
FIG. 4 illustrates processing an isolated object in accordance with one embodiment.

FIG. 4 illustrates processing an isolated object in accordance with one embodiment. In FIG. 4, an isolated object 402 such as, but not limited to, object 212 as previously described may be shown as an example. In accordance with one embodiment, isolated object 402 may be segmented into two or more segments 410-416. Continuing with the example of an object as being a human, as shown in FIG. 4, isolated object 402 may be segmented as follows: a segment representative of a head area (hereon out, a head segment 410), a segment representative of a torso area (hereon out, a torso segment 411), a segment representative of an arm area (hereon out, a first arm segment 412), a segment representative of another arm area (hereon out, a second arm segment 413), a segment representative of a lower torso (hereon out, a lower torso segment 414), a segment representative of a leg segment (hereon out, a first leg segment 415), and a segment representative of another leg segment (hereon out, a second leg segment 416).

As shown in FIG. 4, segments 410-416 may be represented as various colors and/or shades. However, it should be appreciated by those skilled in the art that segments 410-416 may be represented in a variety of manners such as, but not limited to, various patterns, and accordingly, the claimed subject matter need not be limited in these respects. Additionally, in FIG. 4, object 402 may be shown to be segmented into seven segments 410-416. However, it should be appreciated by those skilled in the art that object 402 may be segmented in a number of different manners such as, but not limited to, one segment representative of a top portion (i.e., head, upper torso, and arms) and another segment representative of a bottom portion (i.e., lower torso and legs). Accordingly, the claimed subject matter need not be limited in these respects.

As will be described in further detail, in one embodiment, processing an object may comprise segmenting an object by utilizing color segmenting methods. In another embodiment, processing an object may comprise segmenting an object by utilizing graph-based segmenting. In yet another embodiment, processing an object may comprise applying a principle component analysis (PCA), and in one embodiment, PCA may comprise of determining a major axis of a segment of an object. In yet another embodiment, processing an object may comprise determining a relationship between one or more segments of the object, and in one embodiment, determining a relationship may comprise of determining mass centroids of one or more segments of the object.

Figure 5:
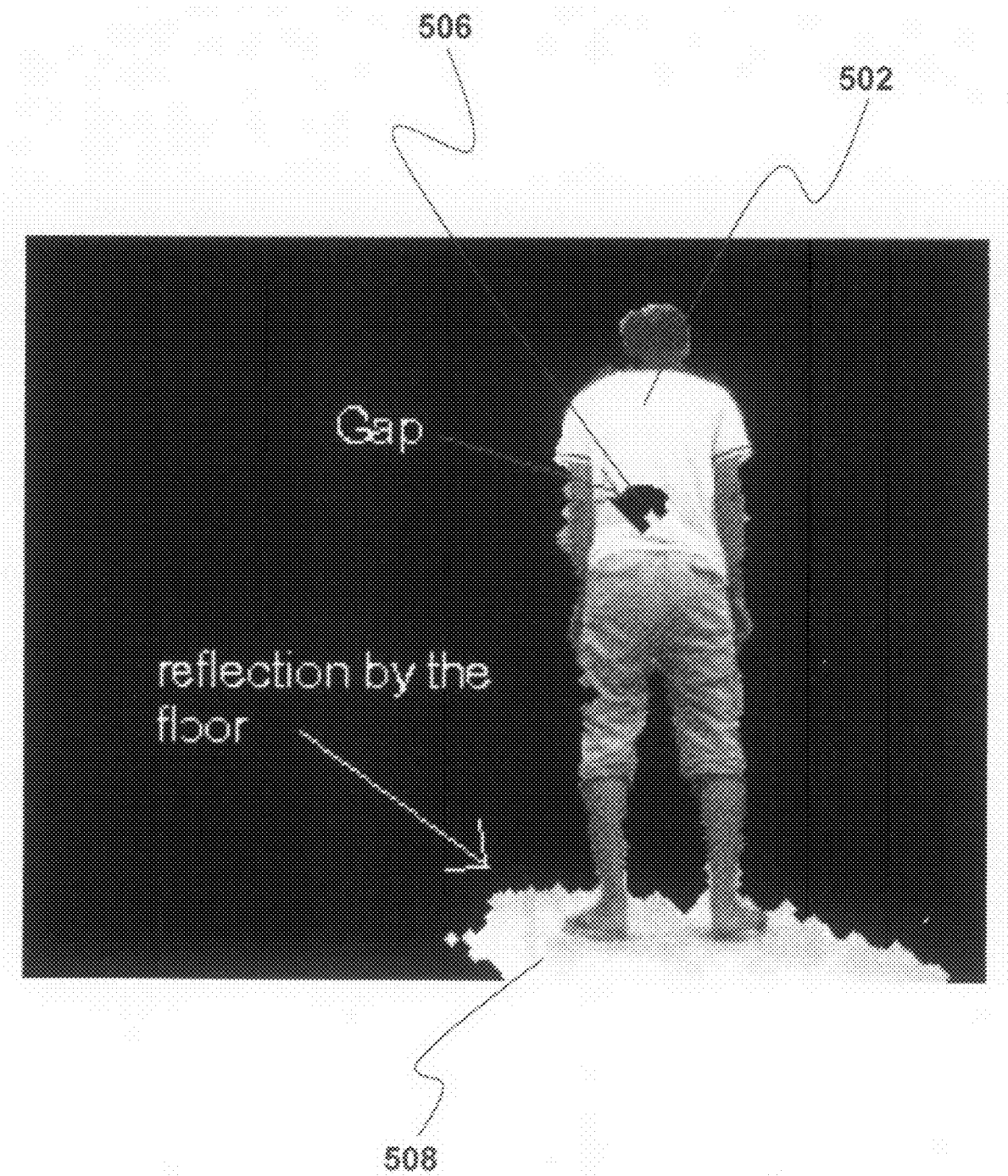
FIG. 5 illustrates isolating an object in accordance with another embodiment.

FIG. 5 illustrates isolating an object in accordance with another embodiment. Shown in FIG. 5, an isolated object 502 may include various unwanted image noise and/or artifacts. For example, isolated object 502 may include a gap (i.e., missing pixels) 506 in a location where there commonly should not be a gap. In another example, object 502 may include a reflected area 508 (i.e., areas that may not be necessarily part of the isolated object 502).

Continuing to refer to FIG. 5, even though object 502 may have unwanted image noise and/or artifacts, through various image processing techniques such as, but not limited to, filling holes to help facilitate filling of gaps, morphology operations to help facilitate removal of small objects, adjustments with threshold associated with the subtraction operation to help facilitate reduction of reflection, and the like. An outcome of addressing unwanted image noise and/or artifacts may be illustrated in FIG. 3. That is, gap 506 may be filled and/or reflected area 508 may be reduced as shown in FIG. 3.

In FIG. 5, unwanted image noise and/or artifacts may include gaps and/or reflections. However, it should be appreciated by those skilled in the art that unwanted noise and/or artifacts may include a wide variety of quality of image related issues, and accordingly, the claimed subject matter is not limited in these respects.

Figures 6A, 6B:
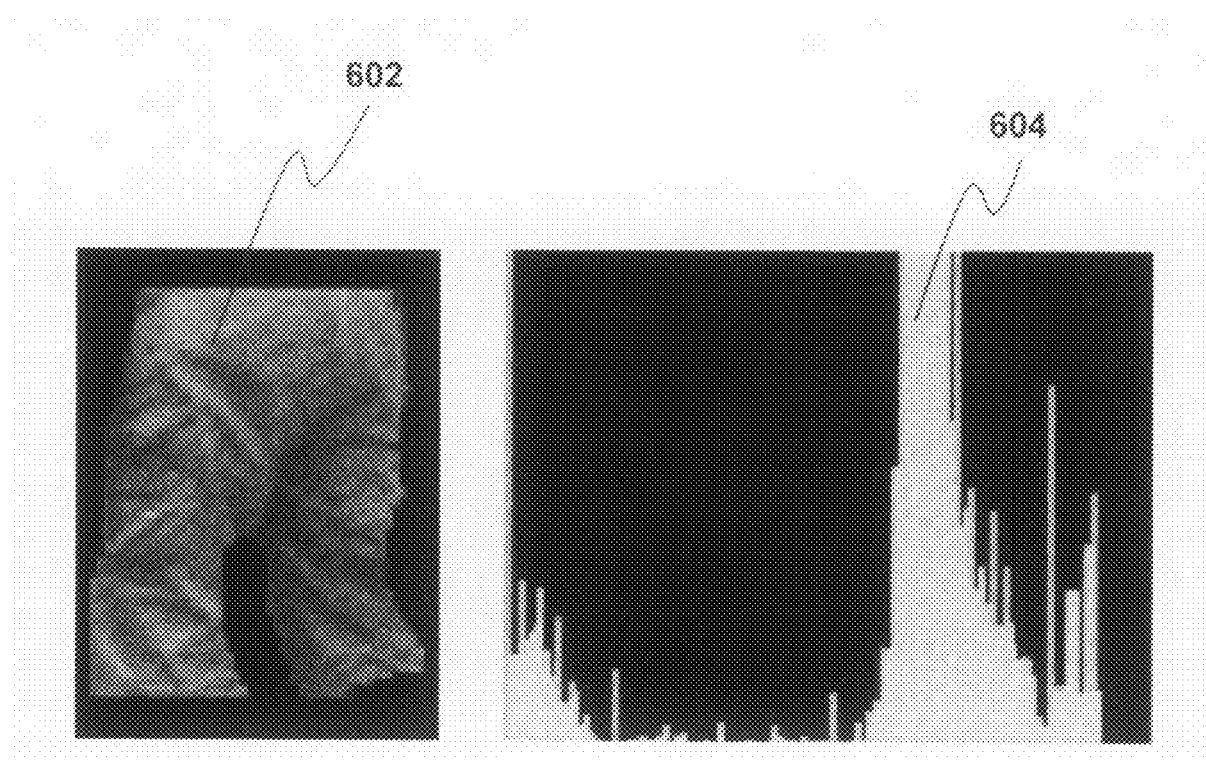
FIGS. 6A & 6B illustrate processing of an isolated object in accordance with one embodiment.

FIGS. 6A & 6B illustrate processing of an isolated object in accordance with one embodiment. In FIG. 6A, for purposes of providing an example, a segment 602 of an object is shown. The segment 602 may be substantially similar to lower torso 413 (as shown in FIG. 4). In the embodiment illustrated in FIGS. 6A & 6B, a statistical representation of segment 602 may be shown as a histogram 604 (shown in FIG. 6B). Histogram 604 may be an approximation of stochastic variable probability distribution associated with segment 602 of FIG. 6A. Further, histogram 604 may be representative of a hue type histogram to help facilitate description of the color of an object whereby an image and/or object commonly associated with red, green, blue (RGB) color space, may be converted to hue saturation value (HSV) or hue saturation intensity (HSI). As such, histogram 604 may be referred to as a color histogram. For the purposes of describing the embodiment illustrated in FIGS. 6A & 6B, segment 602 may be shown, it should be appreciated by those skilled in the art that the described processing may be applicable to any and/or all portions of an object, and accordingly, the claimed subject matter is not limited in these respects.

Histogram 604 may be stored in a database as one or more knowledge databases. The stored histogram 604 may help to facilitate recognition of an object by a machine in accordance with various embodiments of the claimed subject matter. Such a stored histogram may be referred to as a reference color histogram.

Figure 7:
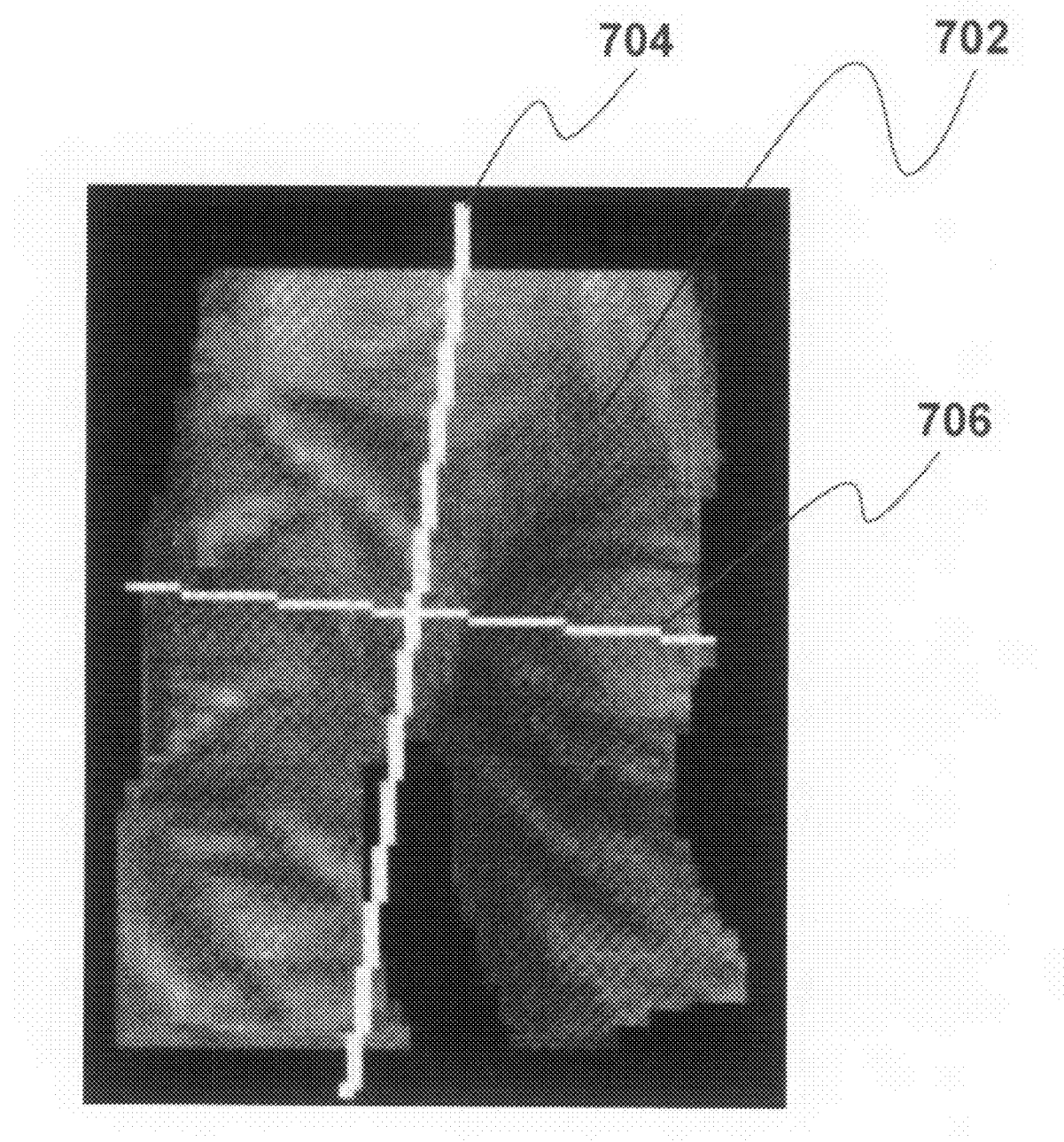
FIG. 7 illustrates processing of an isolated object in accordance with another embodiment.

FIG. 7 illustrates processing of an isolated object in accordance with another embodiment. In FIG. 7, for purposes of providing an example, a segment 702 of an object is shown. The segment 702 may be substantially similar to lower torso 413 (as shown in FIG. 4). In order to determine a relational representation of segment 702, a major axis 704 and a minor axis 706 may be determined by applying principle component analysis (PCA). For example, major axis 704 and minor axis 706 may be determined for segment 702 by vector analysis such as, but not limited to, vector analysis that may utilize eigenvectors and eigenvalues. For example determining an image vector, subtracting a mean for each image vector, calculating a covariance matrix, calculating eigenvectors and eigenvalues of the covariance matrix, and so forth. The result may be major axis 704 and minor axis 706 of segment 702 as shown in FIG. 7. Further, slope values may be determined for major axis 704 and/or minor axis 706 of segment 702.

The resulting major axis 704 and minor axis 706 and/or associated slope values may also be stored in a database as one or more knowledge databases. Such stored slope values may be referred to as reference slope values. The stored major axis 704 and minor axis 706 and/or associated slope values may help to facilitate recognition of an object by a machine in accordance with various embodiments of the claimed subject matter.

Briefly turning to FIGS. 6A, 6B, and 7, for the purposes of describing the claimed subject matter, segments 602 and 604 are illustrated. However, it should be appreciated by those skilled in the art that the previously described embodiments may be applicable to whole objects as well (i.e., need not necessarily be segments, but instead, a segment may be the entire object).

Figures 8A, 8B:
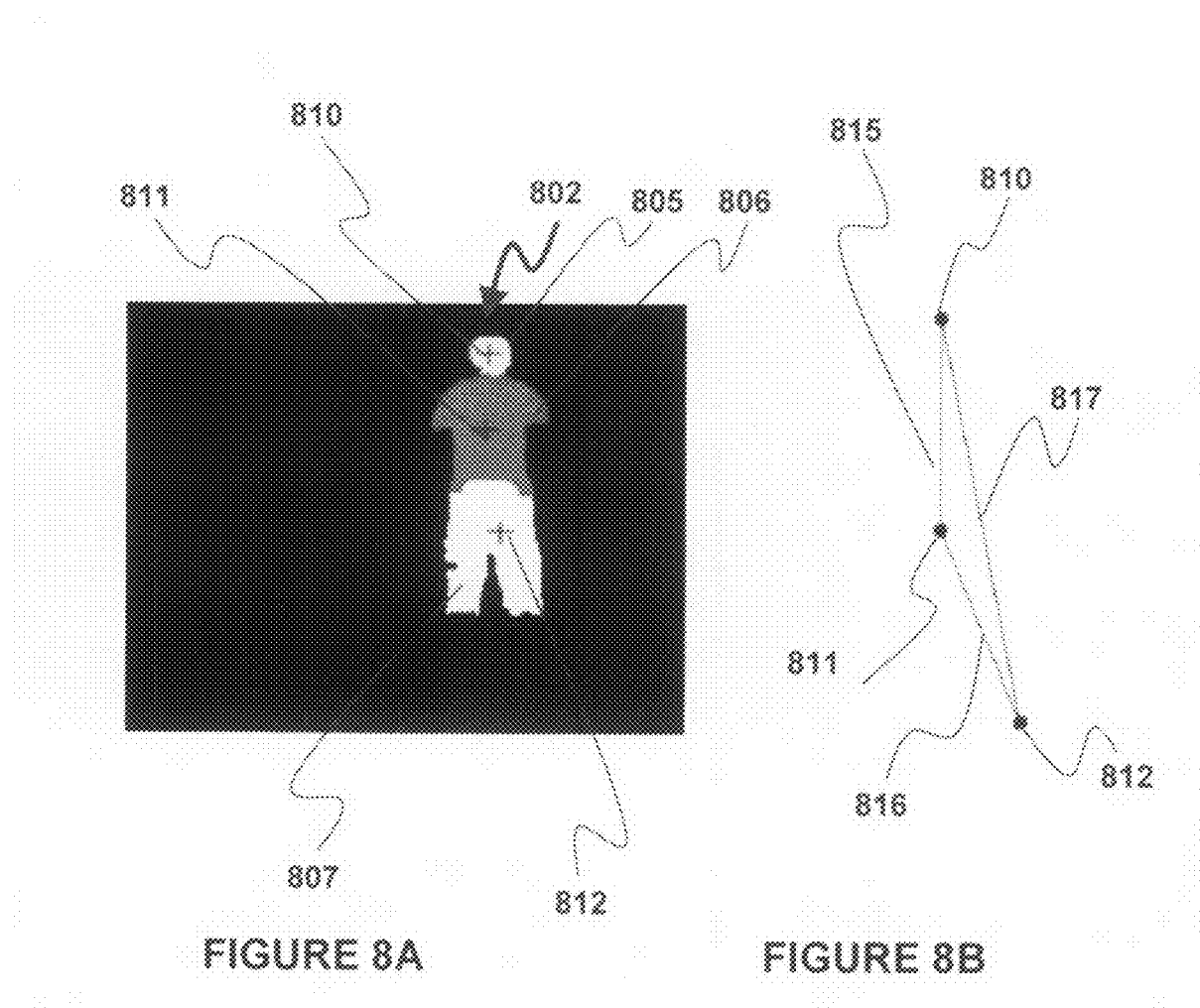
FIGS. 8A & 8B illustrates processing an isolated object in accordance with another embodiment.

FIGS. 8A & 8B illustrates processing an isolated object in accordance with another embodiment. In FIG. 8A, an object 802 may have already been isolated and processed as previously described. Object 802 may have three segments 805-807. Continuing with the example of an object comprising a human, as shown in FIG. 8, a first segment 805 may be representative of a head area, a second segment 806 may be representative of a upper torso area, and a third segment 807 may be representative of a lower torso area. In the illustrated embodiment, a first mass centroid 810 may be determined for first segment 805, a second mass centroid 811 may be determined for second segment 806, and a third mass centroid 812 may be determined for third segment 807. Mass centroids 810-812 may be determined by determining contours of the segments 805-807, and then, determining contour moments of segments 805-807. That is, instead of determining moments of each discrete pixel, moments may be determined by utilizing contours (i.e., borders of the segments 805-807).

In some embodiments, contour moments determined for image segment contours may comprise well-known invariant Hu-moments. Contour moments, such as invariant Hu-moments, may be stored in a database such as, but not limited to, a knowledge database to help facilitate recognition of the object in accordance with various embodiments of the claimed subject matter. Such stored contour moments may be referred to as reference contour moments.

In some embodiments, well-known similarity measurements may be performed between, for example, invariant Hu-moments, to compare determined contour moments to reference contour moments. Thus, for example, invariant Hu-moments determined for a contour may be compared to reference invariant Hu-moments to generate one or more similarity measurements.

Turning now to FIG. 8B, a relationship may be determined between the mass centroids 810-812. For example, linear type relationships may be determined between mass centroids 810-812 as shown in FIG. 8B. That is, a first relationship line 815 may be determined between first mass centroid 810 and second mass centroid 811, a second relationship line 816 may be determined between second mass centroid 811 and third mass centroid 812, and a third relationship line 817 may be determined between third mass centroid 812 and first mass centroid 810 as shown in FIG. 8B. Together, relationship lines 815-817 may represent a relationship for object 802. Further, slope values of relationship lines, such as lines 815-817, may be determined. These relationships may be stored in a database such as, but not limited to a knowledge database to help facilitate recognition of the object in accordance with various embodiments of the claimed subject matter. For example, slope values of relationship lines, such as slope values of lines 815-817, may be stored in a database. Such stored slope values may be referred to a reference slope values.

In various embodiments, isolating an object may comprise applying various filters to an image as previously alluded to.

Figures 9A, 9B:
FIG. 9A-9C illustrate isolating an object in accordance with one embodiment.
Figure 9C:
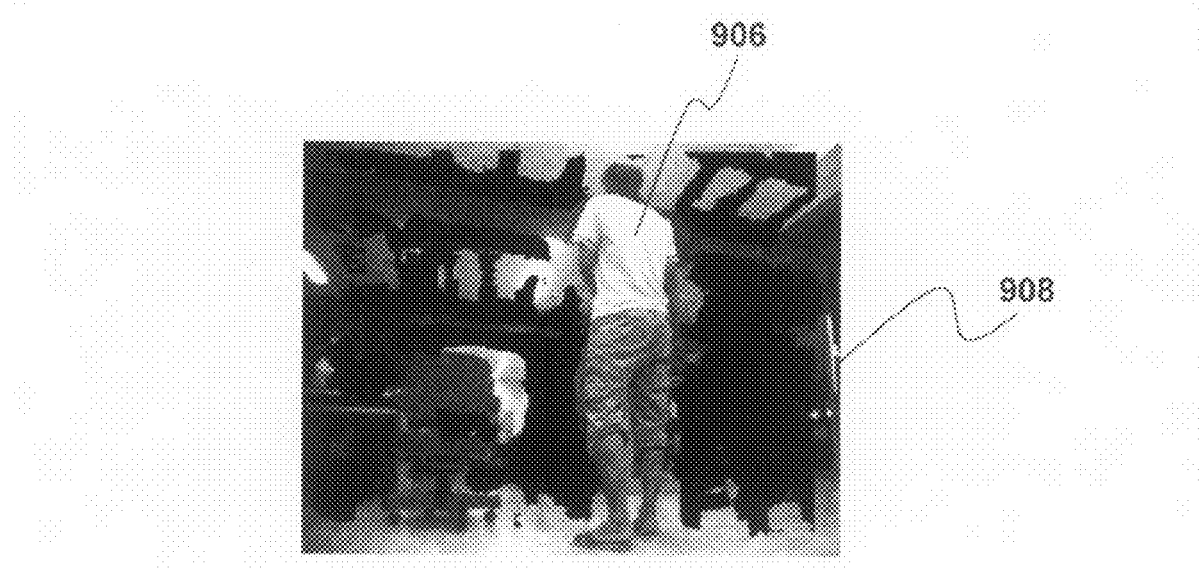

FIG. 9A-9C illustrate isolating an object in accordance with one embodiment. Shown in FIGS. 9A & 9B are images that illustrate stereo filtering an image. In FIG. 9A, an image 902 is shown before stereo filtering may be applied, which may be recognizable as an image of some type of office space. However, in FIG. 9B, image 902 may be shown as various shades such as, but not limited to, color to help denote depth. The depth of objects in image 902 may be determined by depth imaging, where intensity of each pixel may represent distance from an image capturing device, and by determining a correlation between left image and right image, depth of objects within image 902 may be identified and coded such as, but not limited to, color coded. Accordingly, help in isolating objects within a predetermined distance such as, but not limited to, two meters from an image capturing device may be facilitated.

Turning now to FIG. 9C, stereo filtering may be applied to help facilitate isolation of object 906 from image 908 in accordance with one embodiment. Continuing to refer to FIG. 9C, object 906 may be isolated from image 908 by determining that object 906 may be within a predetermined distance from the image capturing device such as, but not limited to, within a predetermined distance making object 906 closest to the image capturing device.

Figure 10:
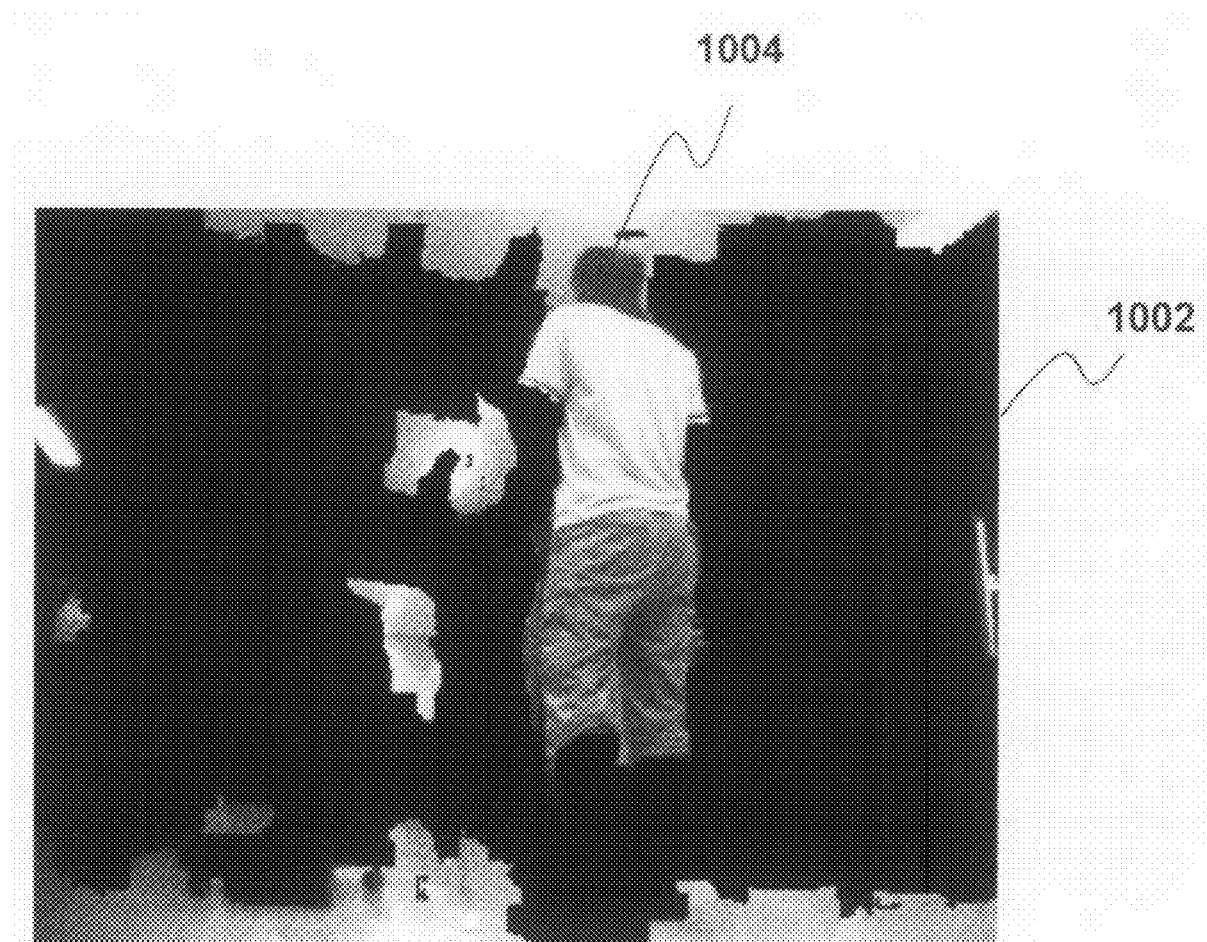
FIG. 10 illustrates isolating an object in accordance with yet another embodiment.

FIG. 10 illustrates isolating an object in accordance with yet another embodiment. Shown in FIG. 10, an image 1002 may include an object 1004. Object 1004 may be isolated from image 1002 by applying a color filter. Accordingly, an RGB image may be converted to an HSV image as previously described. The HSV image may be compared with a database to determine if object 1004 may be recognized by the machine.

Figure 11:
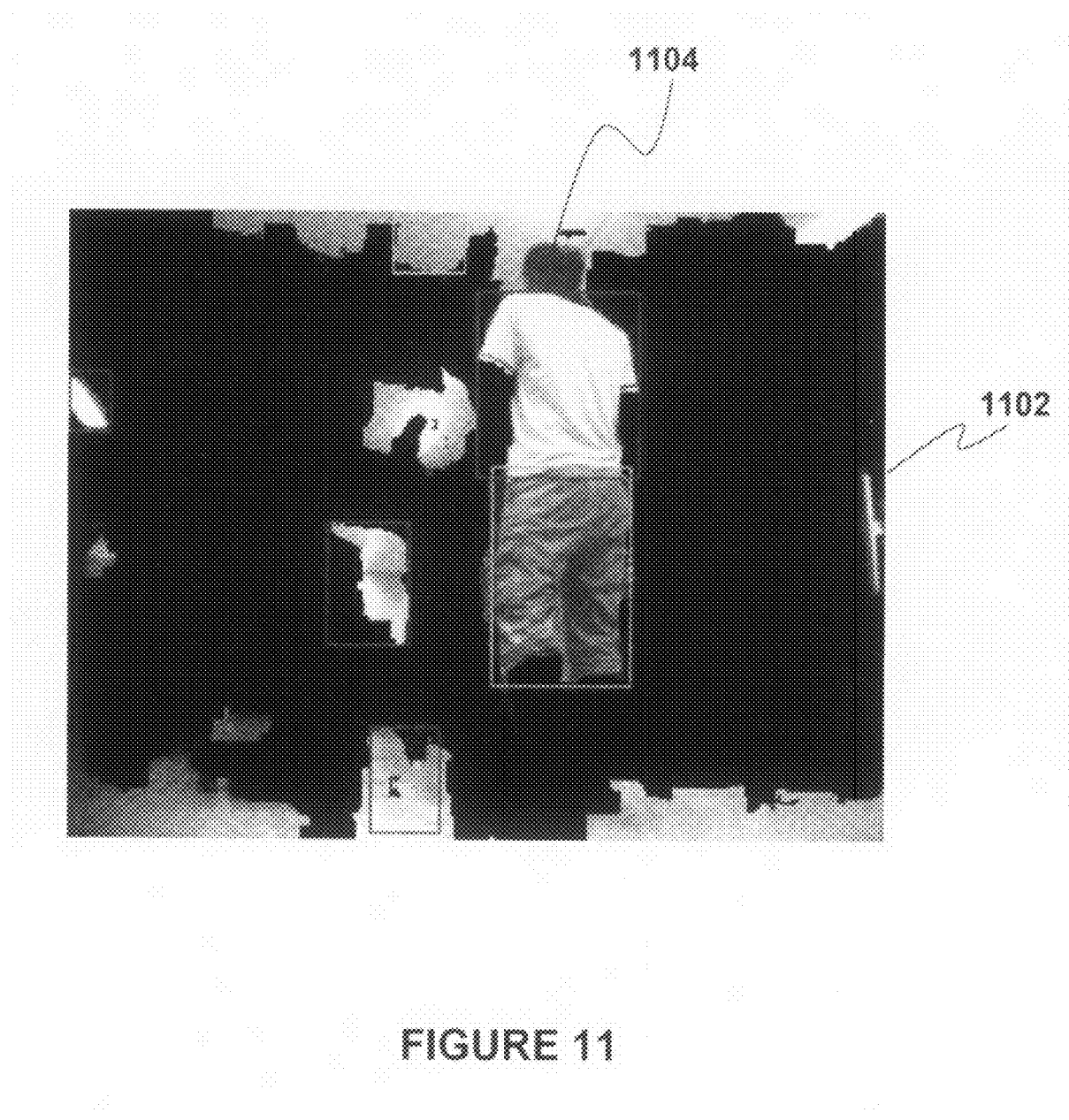
FIG. 11 illustrates isolating an object in accordance with yet another embodiment.

FIG. 11 illustrates isolating an object in accordance with yet another embodiment. Shown in FIG. 11, an image 1102 may include an object 1104. Object 1104 may be isolated from image 1102 by applying a shape filter. Accordingly, contour moments and major axis may be determined for object 1104 as previously described. Major axis of object 1104 may be compared with database to determine if object 1104 may be recognized by the machine.

Figures 12A, 12B:
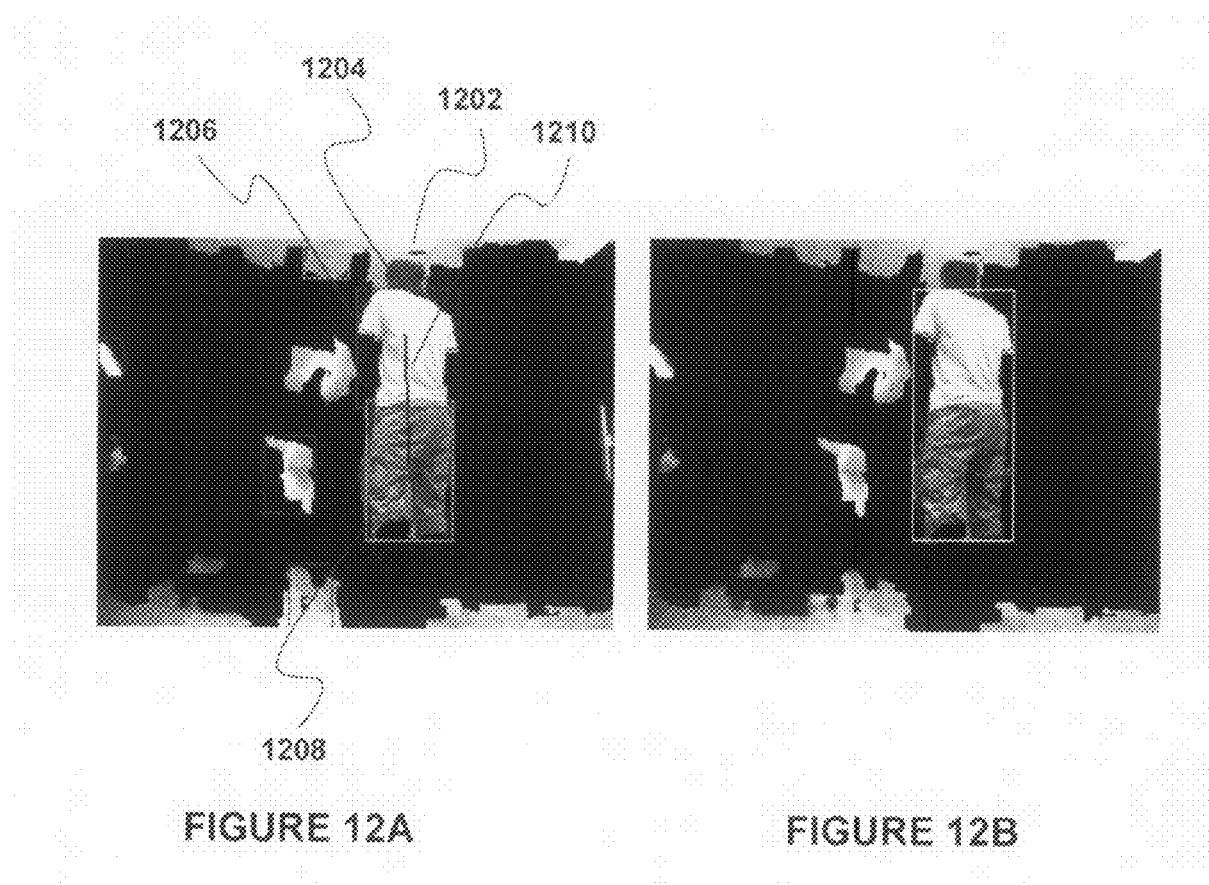
FIGS. 12A & 12B illustrate isolating an object in accordance with another embodiment.

FIGS. 12A & 12B illustrate isolating an object in accordance with another embodiment. Shown in FIG. 12A, an image 1202 may include an object 1204. Object 1204 may comprise of a first segment 1206, which may be representative of a upper torso of a human, and a second segment 1208, which may be representative of a lower torso of a human. In FIG. 12, object 1202 may be isolated from image 1202 by applying a relationship filter as previously described. Accordingly, a relationship line 1210 may be determined between first segment 1206 and second segment 1208 with mass centroids at the respective ends of the relationship line 1210. This relationship may be compared with a database to determine if object 1204 may be recognized by the machine.

In one embodiment, a stereo image sensing device may be utilized to locate an object relative to the image sensing device (i.e., the machine).

In order to describe the embodiments, references have been made to an object being substantially similar to a human. However, it should be appreciated by those skilled in the art that the object may be a wide variety of objects such as, but not limited to, animals, dogs, vehicles, etc., where recognition by a machine may be desired. Further, it should be appreciated by those skilled in the art that it is contemplated that in various embodiments, recognition of an object by a machine may facilitate tracking of the object by the machine such as, but not limited to, a robot type machine that may have mobility to recognize and move follow an object (i.e., interact with the object).

Figure 13:
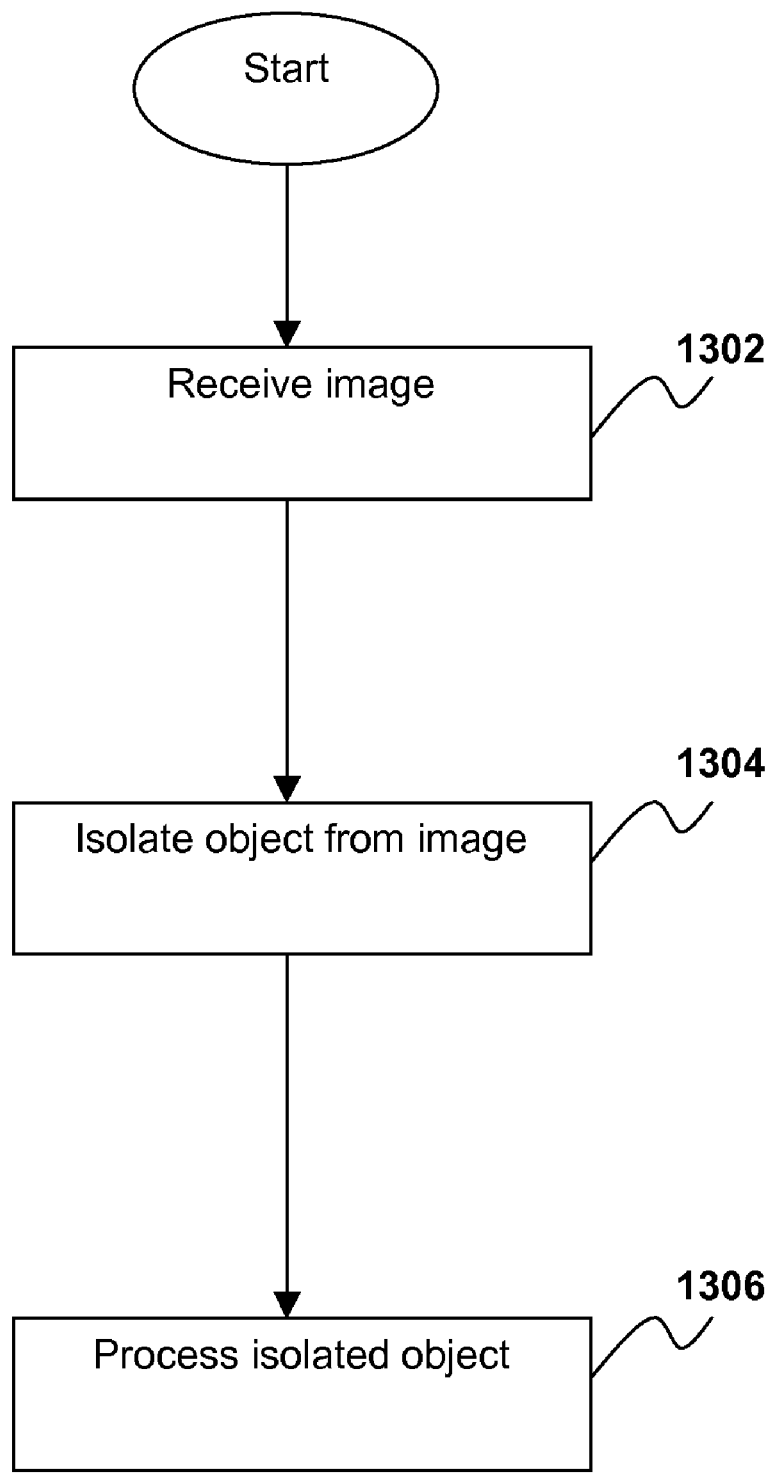
FIG. 13 illustrates an operational flow of object recognition manager in accordance with one embodiment.

FIG. 13 illustrates an operational flow of object recognition manager in accordance with one embodiment. For the illustrated embodiment, object recognition manager 108 may be programmed in an event driven model (i.e., object recognition manager 108 may be designed to be executed in a system environment where various event notification services may be available from an operating system. One example of such operating system suitable for practicing the claimed subject matter may be the Windows® type operating systems, available from Microsoft Corporation of Redmond, Wash. In alternate embodiments, object recognition manager 108 may be implemented in other programming approaches.

As shown in FIG. 13, responsive to receiving an image having an object (i.e., an object of interest such as, but not limited to a human) at block 1302, object recognition manager 108 may isolate the object from the image at block 1304. At block 1306, the isolated object may be processed to facilitate recognition of the object by a machine. The manner in which object recognition manager 108 facilitates isolating and processing an object may be accomplished in a wide variety of number of application dependent manners as described earlier.

Figure 14:
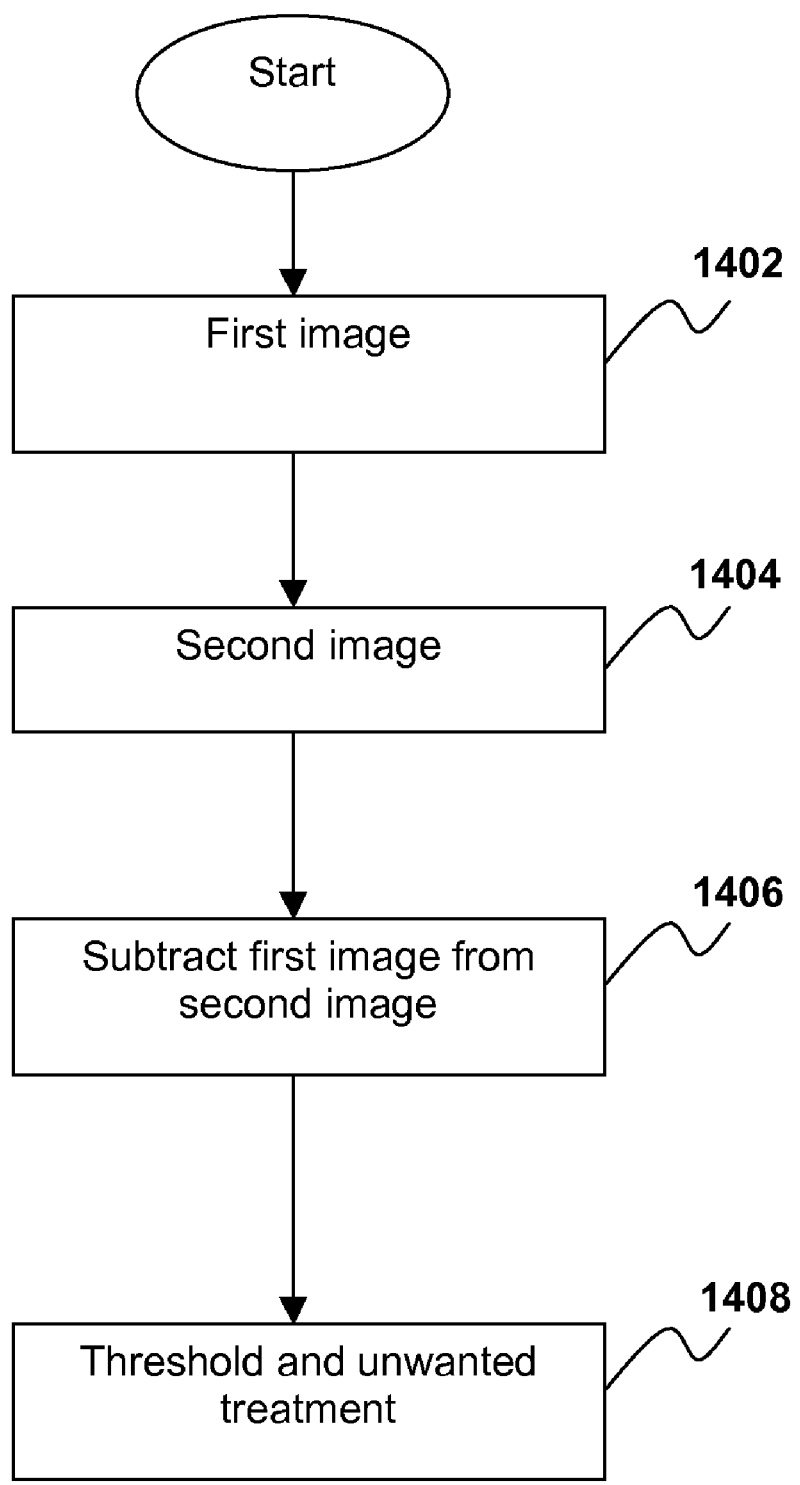
FIG. 14 illustrates an operational flow of isolating an object in further detail, in accordance with one embodiment.

FIG. 14 illustrates an operational flow of isolating an object in further detail, in accordance with one embodiment. In FIG. 14, a first image may be received at block 1402. The first image may be an image of surroundings of the image sensing device (i.e., surroundings of the camera and/or machine). At block 1404, a second image may be received having an object. The first image may be subtracted from the second image resulting in isolation of the object at block 1406. Additionally, at block 1408, unwanted noise and/or artifacts may be addressed as previously described.

Figure 15:
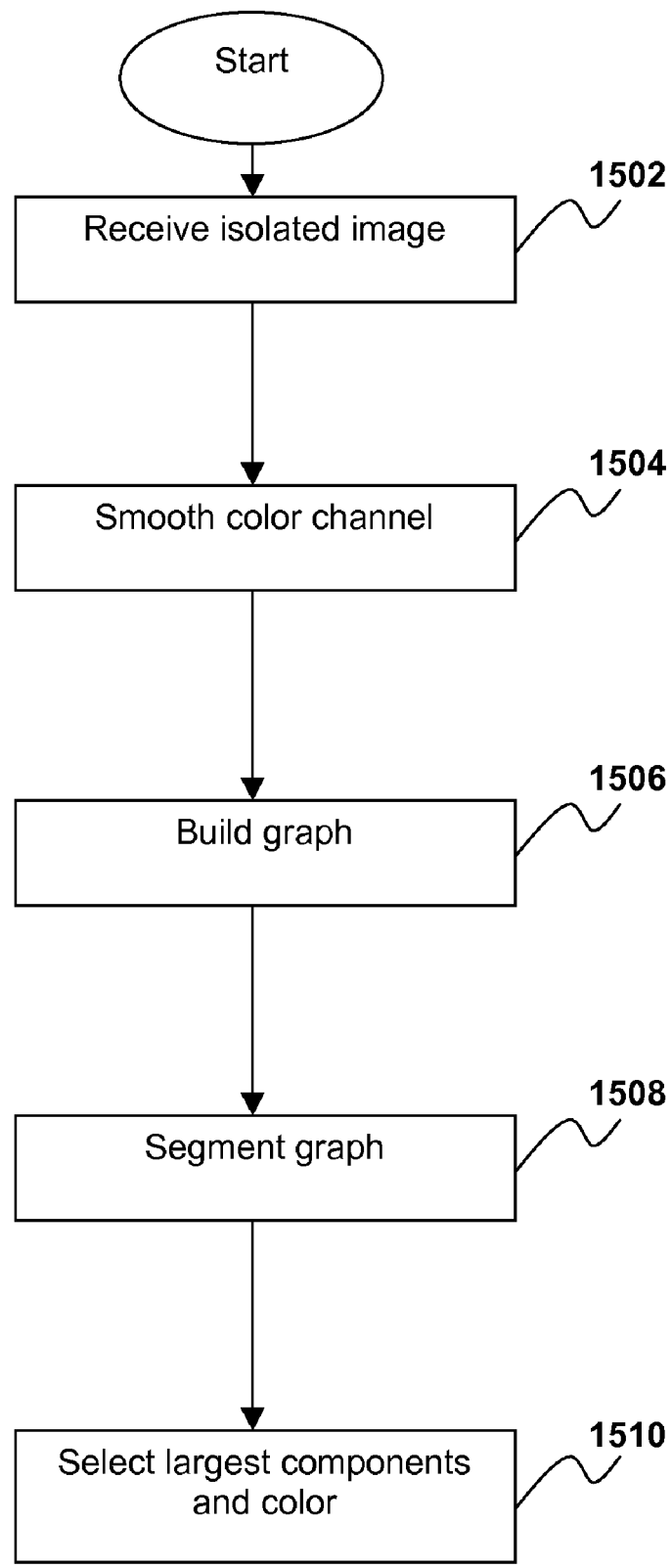
FIG. 15 illustrates an operational flow of segmenting an object in accordance with one embodiment.

FIG. 15 illustrates an operational flow of segmenting an object in accordance with one embodiment. In FIG. 15, an isolated object may be received for processing at block 1502. Each color channel may be smoothed at block 1504. A graph may be produced from the image at block 1506. The image may then be segmented utilizing graph based image segmentation at block 1508. The largest segments may be selected and color coded at block 1510.

Figure 16:
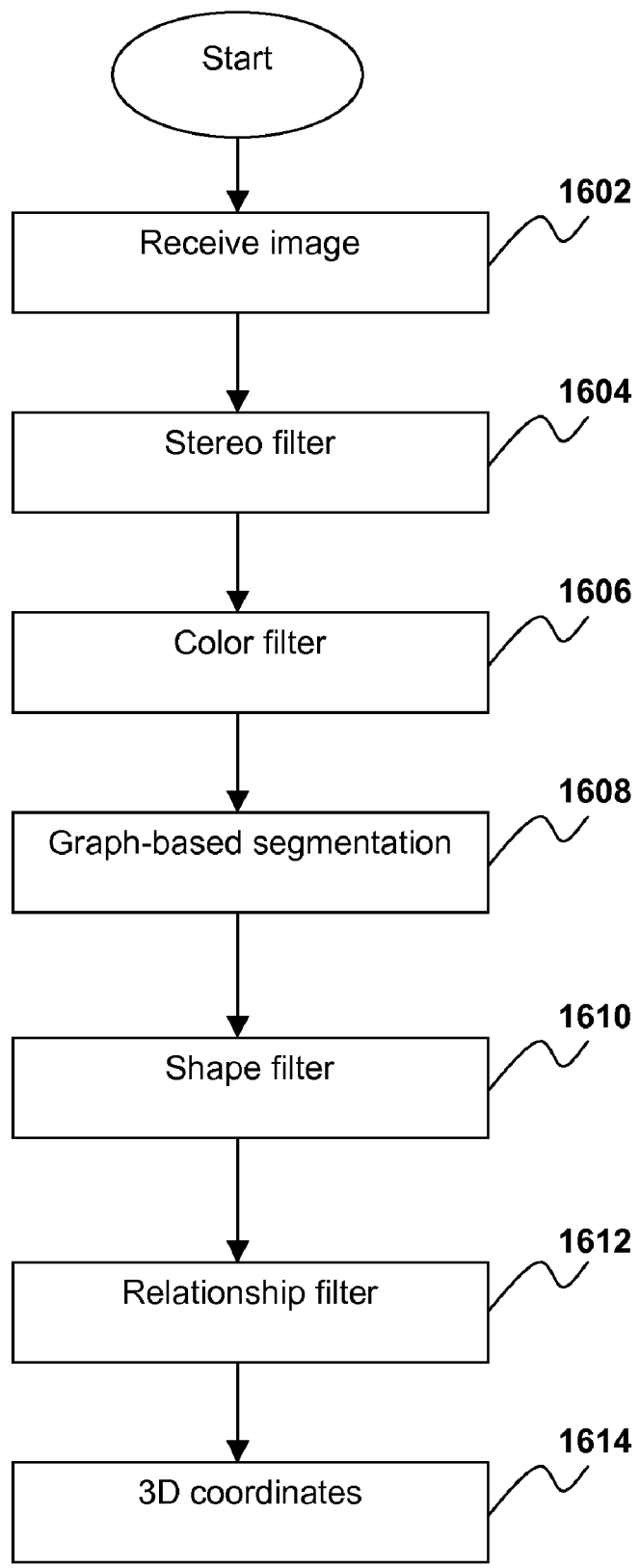
FIG. 16 illustrates an operational flow of object recognition manager in accordance with another embodiment.

FIG. 16 illustrates an operational flow of object recognition manager in accordance with another embodiment. In FIG. 16, an image may be received having an object (i.e., an object of interest such as, but not limited to a human) at block 1602. At block 1604 a stereo filter may be applied to the image to isolate the object. As previously described, the stereo filter may be utilized to determine an object within an image that may be determined to be within a predetermined distance from an image sensing device (i.e., camera and/or machine). A color filter may be applied to the image to isolate the object from the image at block 1606. In order to help facilitate recognition of the object, recognition manager 108 may also employ graph-based segmentation at block 1608. Once segmented, a shape filter and a relationship filter may be applied to further recognize the object at blocks 1610 and 1612 respectively. Finally, at block 1614, a three dimensional coordinate of the recognized object may be determined (i.e., a proximate location of the object).

Figure 17:
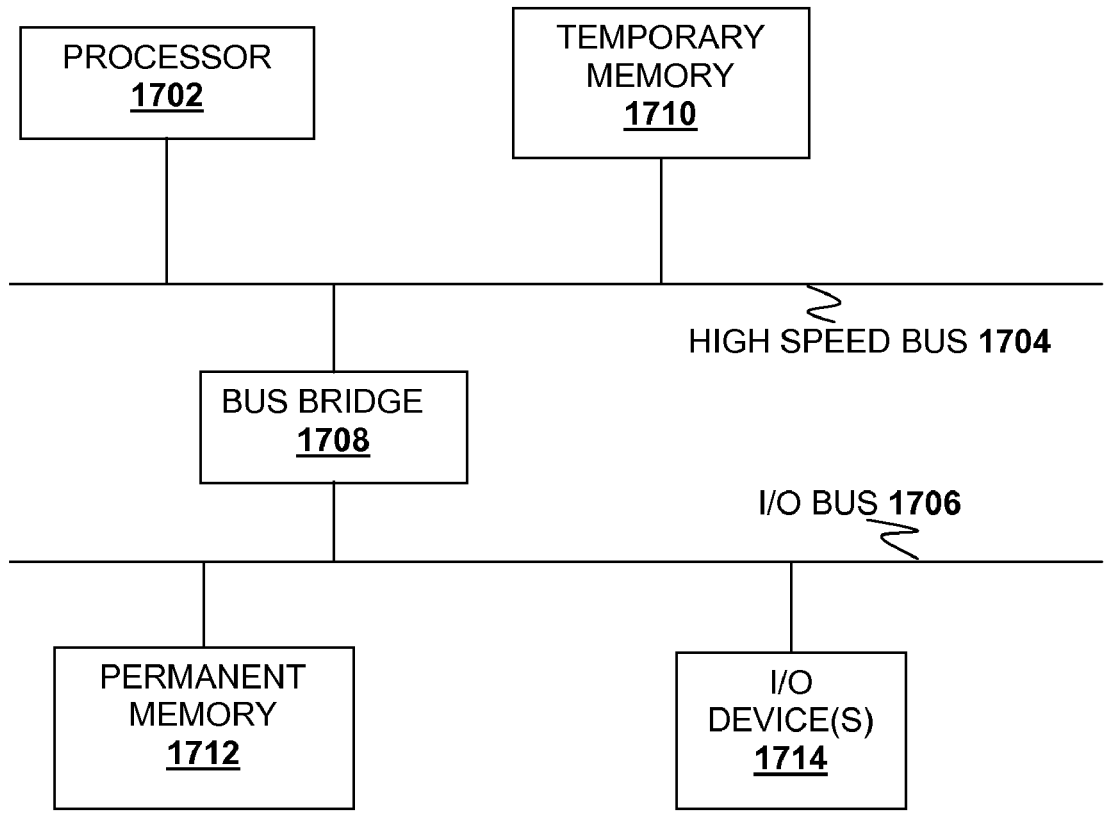
FIG. 17 illustrates one embodiment of a generic hardware system that can bring together the functions of various embodiments of the disclosed subject matter.

FIG. 17 illustrates one embodiment of a generic hardware system that can bring together the functions of various embodiments of the disclosed subject matter. In the illustrated embodiment, the hardware system may include processor 1702 coupled to high speed bus 1704, which may be coupled to input/output (I/O) bus 1706 through bus bridge 1708. Temporary memory 1710 may be coupled to bus 1704. Permanent memory 1712 may be coupled to bus 1706. I/O device(s) 1714 may be also coupled to bus 1706. I/O device(s) 1714 may include a display device, a keyboard, one or more external network interfaces, image sensing device, etc.

Certain embodiments may include additional components, may not require all of the above components, or may combine one or more components. For instance, temporary memory 1710 may be on-chip with processor 1702. Alternately, permanent memory 1712 may be eliminated and temporary memory 1710 may be replaced with an electrically erasable programmable read only memory (EEPROM), wherein software routines may be executed in place from the EEPROM. Some implementations may employ a single bus, to which all of the components may be coupled, while other implementations may include one or more additional buses and bus bridges to which various additional components may be coupled. Similarly, a variety of alternate internal networks may be used including, for instance, an internal network based on a high speed system bus with a memory controller hub and an I/O controller hub. Additional components may include additional processors, a CD ROM drive, additional memories, and other peripheral components known in the art.

Figure 18:
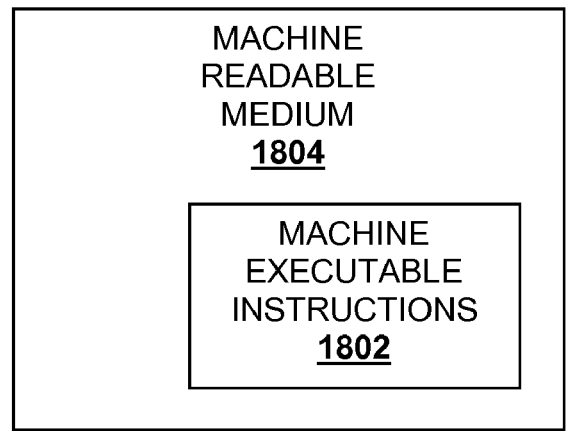
FIG. 18 illustrates one embodiment of a machine readable medium that may be suitable for claimed subject matter.

Various functions of the claimed subject matter, as described above, may be implemented using one or more of these hardware systems. In one embodiment, the functions may be implemented as instructions or routines that may be executed by one or more execution units, such as processor 1702, within the hardware system(s). As shown in FIG. 18, these machine executable instructions 1802 may be stored using any machine readable storage medium 1804, including internal memory, such as memories 1710 and 1712 in FIG. 17, as well as various external or remote memories, such as a hard drive, diskette, CD-ROM, magnetic tape, digital video or versatile disk (DVD), laser disk, Flash memory, a server on a network, etc. These machine executable instructions may also be stored in various propagated signals, such as wireless transmissions from a server to a client. In one implementation, these software routines can be written in the C programming language. It is to be appreciated, however, that these routines may be implemented in any of a wide variety of programming languages.

Figure 19:
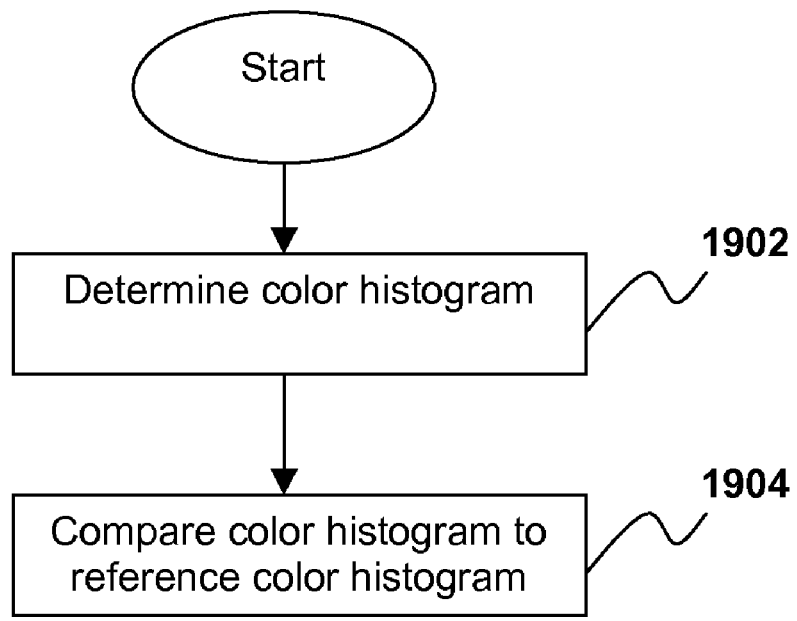
FIG. 19 illustrates an operational flow of color filter processing in accordance with one embodiment.

FIG. 19 illustrates an operational flow of a color filter process in accordance with another embodiment, such as, for example, in accordance with block 1606 of FIG. 16. In FIG. 19, a color histogram may be determined for an image at block 1902. At block 1904, the color histogram may then be compared to a reference color histogram.

Figure 20:
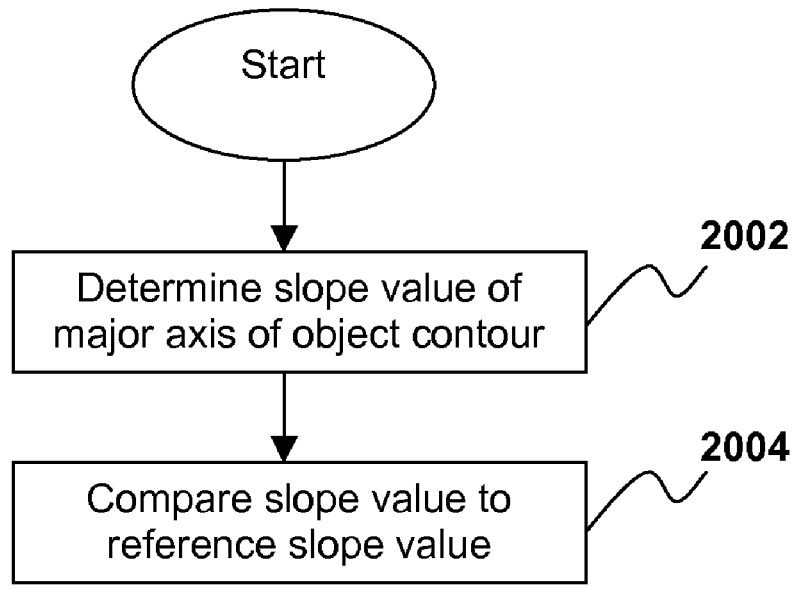
FIG. 20 illustrates an operational flow of shape filter processing in accordance with one embodiment.

FIG. 20 illustrates an operational flow of a shape filter process in accordance with another embodiment, such as, for example, in accordance with block 1610 of FIG. 16. In FIG. 20, a slope value may be determined for a major axis of an object contour at block 2002. At block 2004, the slope value may then be compared to a reference slope value.

Figure 21:
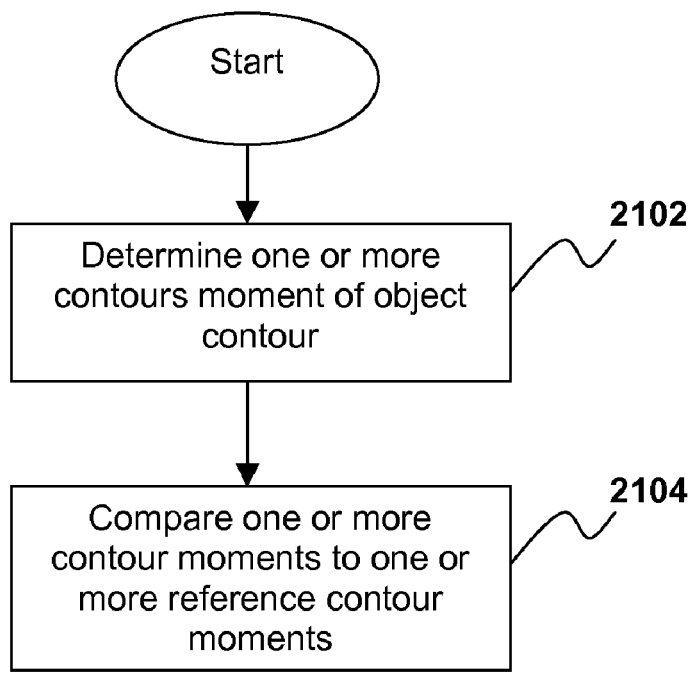
FIG. 21 illustrates an operational flow of shape filter processing in accordance with one embodiment.

FIG. 21 illustrates an operational flow of a shape filter process in accordance with another embodiment, such as, for example, in accordance with block 1610 of FIG. 16. In FIG. 21, one or more contour moments may be determined for an object contour at block 2102. At block 2104, the one or more contour moments may then be compared to one or more reference contour moments.

Figure 22:
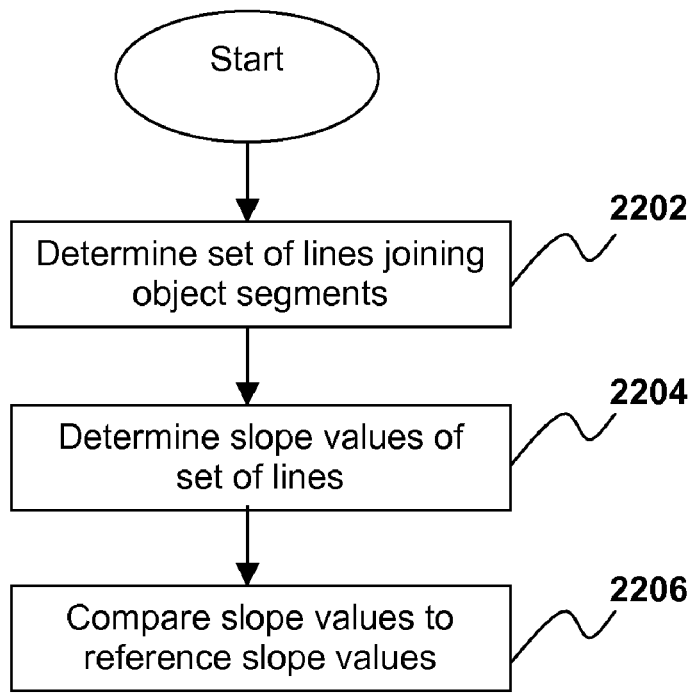
FIG. 22 illustrates an operational flow of relationship filter processing in accordance with one embodiment.

FIG. 22 illustrates an operational flow of a relationship filter process in accordance with another embodiment, such as, for example, in accordance with block 1612 of FIG. 16. In FIG. 22, a set of lines joining object segments may be determined at block 2202. At block 2204, the slope values may be determined for the set of lines. The slope values may then be compared to reference slope values at block 2206.

In alternate embodiments, various functions of the claimed subject matter may be implemented in discrete hardware or firmware. For example, one or more application specific integrated circuits (ASICs) could be programmed with one or more of the above described functions. In another example, one or more functions of the claimed subject matter may be implemented in one or more ASICs on additional circuit boards and the circuit boards could be inserted into the computer(s) described above. In another example, one or more programmable gate arrays (PGAs) could be used to implement one or more functions of the claimed subject matter. In yet another example, a combination of hardware and software could be used to implement one or more functions of the claimed subject matter.

While there has been illustrated and/or described what are presently considered to be example embodiments of claimed subject matter, it will be understood by those skilled in the art that various other modifications may be made, and/or equivalents may be substituted, without departing from the true scope of claimed subject matter. Additionally, many modifications may be made to adapt a particular situation to the teachings of claimed subject matter without departing from subject matter that is claimed. Therefore, it is intended that the patent not be limited to the particular embodiments disclosed, but that it covers all embodiments falling within the scope of the appended claims.

What is claimed is:

1. A computer implemented method comprising:
   receiving an image, the image having an object;
   isolating the object from the image by applying at least one of a color filter, a shape filter or a distance filter to the image;
   determining two or more segments of the isolated object;
   determining a set of contours for each segment;
   using each set of contours to determine a set of invariant Hu moments for each segment, wherein one of the invariant Hu moments represents a mass centroid of each segment;
   determining a set of lines connecting the mass centroids; and
   applying a relationship filter to the object to facilitate recognition of the object by a machine;
   wherein applying the relationship filter comprises:
      comparing each set of invariant Hu moments to reference Hu moments;
      determining slope values of the set of lines connecting the mass centroids; and
      comparing the slope values to reference slope values.

2. The method of claim 1, wherein applying the color filter comprises:
   determining a color histogram of the object; and
   comparing the color histogram to a reference color histogram.

3. The method of claim 1, wherein applying the shape filter comprises:
   determining a slope value of a major axis of a contour of the object; and
   comparing the slope value to a reference slope value.

4. The method of claim 1, wherein receiving the image comprises receiving the image from an image sensing device.

5. The method of claim 4, wherein the image sensing device comprises one of a charged coupled device (CCD) or a complementary metal-oxide semiconductor (CMOS) device.

6. The method of claim 1, wherein receiving the image comprises receiving the image having the object being within a surroundings.

7. The method of claim 1, wherein isolating the object comprises subtracting an object image from the image.

8. The method of claim 7, wherein subtracting the object image comprises addressing unwanted image noise or artifacts.

9. The method of claim 1, wherein isolating the object comprises determining if the object is included within a database.

10. The method of claim 9, wherein determining if the object is included within the database comprises comparing the object to a knowledge database.

11. The method of claim 1, wherein applying the distance filter comprises applying a stereo filter.

12. The method of claim 11, wherein applying the stereo filter comprises utilizing depth of image processing.

13. The method of claim 1, wherein determining two or more segments of the isolated object comprises image segmenting.

14. The method of claim 13, wherein the image segmenting comprises graph-based segmenting.

15. The method of claim 13, wherein the image segmenting comprises color segmenting.

16. The method of claim 15, wherein the color segmenting comprises histogram calculations.

17. The method of claim 1, further comprising applying a principle component analysis (PCA).

18. The method of claim 17, wherein applying PCA comprises determining a major axis of a segment of the object.

19. The method of claim 18, further comprises comprising determining a relationship between two or more segments of the object.

20. The method of claim 1, further comprising:
tracking the object based at least in part on the recognition of the object.

21. A computer readable non-transitory medium having stored therein a plurality of programming instructions which, when executed, cause a computer to:
receive an image, the image having an object;
isolate the object from the image by applying at least one of a color filter, a shape filter or a distance filter to the image;
determine two or more segments of the isolated object;
determine a set of contours for each segment;
use each set of contours to determine a set of invariant Hu moments for each segment, wherein one of the invariant Hu moments represents a mass centroid of each segment;
determine a set of lines connecting the mass centroids; and
apply a relationship filter to the object to facilitate recognition of the object by the computer;
wherein the programming instructions, when executed to apply the relationship filter, cause the computer to:
compare each set of invariant Hu moments to reference Hu moments;
determine slope values of the of the set of lines connecting the mass centroids; and
compare the slope values to reference slope values.

22. The computer readable non-transitory medium of claim 21, wherein the programming instructions, when executed to apply the color filter, cause the computer to:
determine a color histogram of the object; and
compare the color histogram to a reference color histogram.

23. The computer readable non-transitory medium of claim 21, wherein the programming instructions, when executed to apply the shape filter, cause the computer to:
determine a slope value of a major axis of a contour of the object; and
compare the slope value to a reference slope value.

24. The computer readable non-transitory medium of claim 21, wherein the programming instructions, when executed to receive the image, cause the computer to receive the image from one of a charged coupled device (CCD) or a complementary metal-oxide semiconductor (CMOS) device.

25. The computer readable non-transitory medium of claim 21, wherein the programming instructions, when executed to receive the image, cause the computer to receive the image having the object being within a surroundings.

26. The computer readable non-transitory medium of claim 21, wherein the programming instructions, when executed to isolate the object, cause the computer to subtract the object from the image.

27. The computer readable non-transitory medium of claim 26, wherein the programming instructions, when executed to subtract the object, cause the computer to address unwanted image noise or artifacts.

28. The computer readable non-transitory medium of claim 21, wherein the programming instructions, when executed to isolate the object, cause the computer to determine if the object is included within a database.

29. The computer readable non-transitory medium of claim 28, wherein the programming instructions, when executed to determine if the object is included within the database, cause the computer to compare the object to a knowledge database.

30. The computer readable non-transitory medium of claim 21, wherein the programming instructions, when executed to apply the distance filter, cause the computer to apply a stereo filter.

31. The computer readable non-transitory medium of claim 30, wherein the programming instructions, when executed to apply the stereo filter, cause the computer to utilize depth of image processing.

32. The computer readable non-transitory medium of claim 21, wherein the programming instructions, when executed to determine two or more segments of the isolated object, cause the computer to image segment.

33. The computer readable non-transitory medium of claim 21, wherein the programming instructions, when executed to determine two or more segments of the isolated object, cause the computer to color segment.

34. The computer readable non-transitory medium of claim 33, wherein the programming instructions, when executed to color segment, cause the computer to color segment utilizing histogram calculations.

35. The computer readable non-transitory medium of claim 21, wherein the programming instructions, when executed to determine two or more segments of the isolated object, cause the computer to determine the segments utilizing graph-based segmentation.

36. The computer readable non-transitory medium of claim 21, wherein the programming instructions, when executed, cause the computer to apply a principle component analysis (PCA).

37. The computer readable non-transitory medium of claim 36, wherein the programming instructions, when executed, cause the computer to determine a major axis of a segment of the object.

38. The computer readable non-transitory medium of claim 37, wherein the programming instructions, when executed, cause the computer to determine a relationship between two or more segments of the object.

39. The computer readable non-transitory medium of claim 21, wherein the programming instructions, when executed, cause the computer to track the object based at least in part on the recognition of the object.

40. An apparatus comprising:
a machine readable medium having stored therein a plurality of programming instructions which, when executed, cause the apparatus to:
receive an image, the image having an object;
isolate the object from the image by applying at least one of a color filter, a shape filter or a distance filter to the image; and
determine two or more segments of the isolated object;
determine a set of contours for each segment;
use each set of contours to determine a set of invariant Hu moments for each segment, wherein one of the invariant Hu moments represents a mass centroid of each segment;
determine a set of lines connecting the mass centroids; and
apply a relationship filter to the object to facilitate recognition of the object by a machine;
wherein the programming instructions, when executed to apply the relationship filter, cause the apparatus to:
compare each set of invariant Hu moments to reference Hu moments;
determine slope values of the at least one set of lines; and
compare the slope values to reference slope values; and
a processor coupled to the machine readable medium to execute the programming instructions.

41. The apparatus of claim 40, wherein the programming instructions, when executed to apply the color filter, cause the apparatus to:
determine a color histogram of the object; and
compare the color histogram to a reference color histogram.

42. The apparatus of claim 40, wherein the programming instructions, when executed to apply the shape filter, cause the apparatus to:
determine a slope value of a major axis of a contour of the object; and
compare the slope value to a reference slope value.

43. The apparatus of claim 40, wherein the programming instructions, when executed to receive the image, cause the apparatus to receive the image from one of a charged coupled device (CCD) or a complementary metal-oxide semiconductor (CMOS) device.

44. The apparatus of claim 40, wherein the programming instructions, when executed to receive the image, cause the apparatus to receive the image having the object being within a surroundings.

45. The apparatus of claim 40, wherein the programming instructions, when executed to isolate the object, cause the apparatus to subtract the object from the image.

46. The apparatus of claim 45, wherein the programming instructions, when executed to subtract the object, cause the apparatus to address unwanted image noise or artifacts.

47. The apparatus of claim 40, wherein the programming instructions, when executed to isolate the object, cause the apparatus to determine if the object is included within a database.

48. The apparatus of claim 47, wherein the programming instructions, when executed to determine if the object is included within the database, cause the apparatus to compare the object to a knowledge database.

49. The apparatus of claim 40, wherein the programming instructions, when executed to apply the distance filter, cause the apparatus to apply a stereo filter.

50. The apparatus of claim 49, wherein the programming instructions, when executed to apply the stereo filter, cause the apparatus to utilize depth of image processing.

51. The apparatus of claim 40, wherein the programming instructions, when executed to determine two or more segments of the isolated object, cause the apparatus to image segment.

52. The apparatus of claim 40, wherein the programming instructions, when executed to determine two or more segments of the isolated object, cause the apparatus to color segment.

53. The apparatus of claim 52, wherein the programming instructions, when executed to color segment, cause the apparatus to color segment utilizing histogram calculations.

54. The apparatus of claim 40, wherein the programming instructions, when executed to determine two or more segments of the isolated object, cause the apparatus to segment utilizing graph-based segmentation.

55. The apparatus of claim 40, wherein the programming instructions, when executed, cause the apparatus to apply a principle component analysis (PCA).

56. The apparatus of claim 55, wherein the programming instructions, which when executed, cause the apparatus to determine a major axis of a segment of the object.

57. The apparatus of claim 56, wherein the programming instructions, when executed, cause the apparatus to determine a relationship between two or more segments of the object.

58. The apparatus of claim 40, wherein the programming instructions, when executed, cause the apparatus to track the object based at least in part on the recognition of the object.

* * * * *